Nov. 5, 1946.  J. H. LETSINGER ET AL  2,410,511
SYNCHRONIZING DEVICE
Filed Aug. 26, 1944
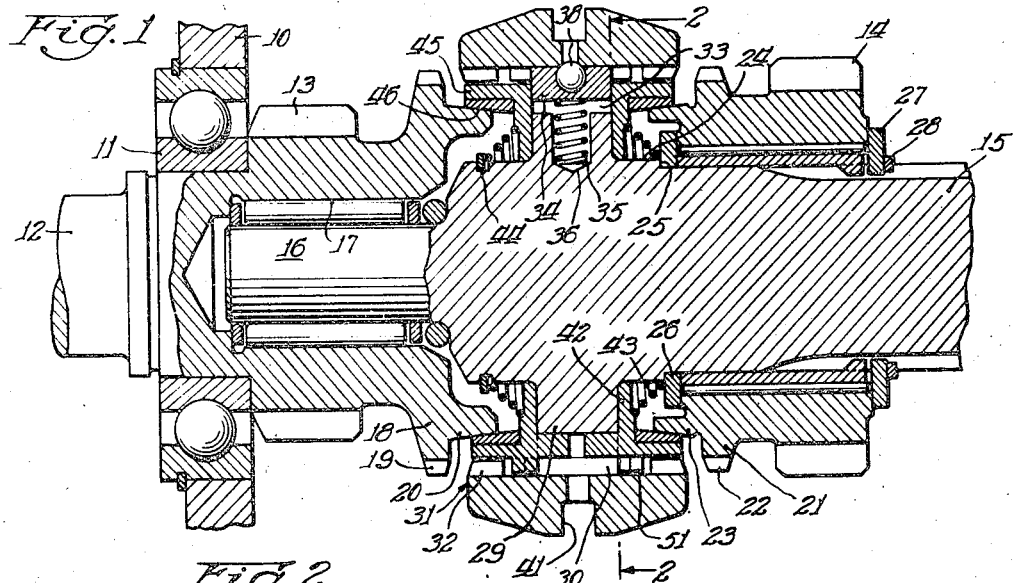
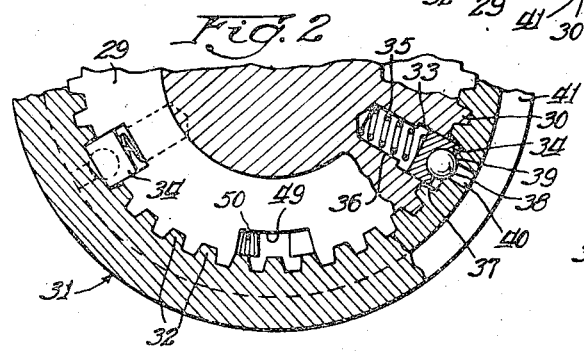
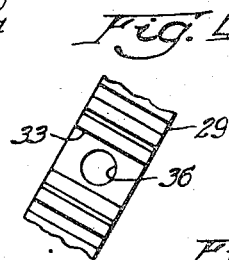
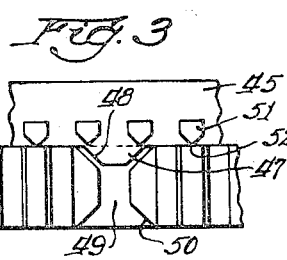
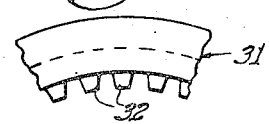
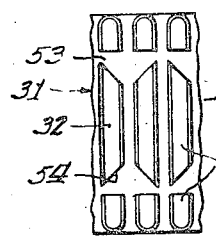
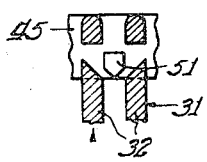
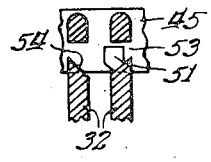
Inventors:
J. H. Letsinger and
Harold F. Foley
By: Paul O. Pippel Patented Nov. 5, 1946

2,410,511

UNITED STATES PATENT OFFICE 2,410,511

SYNCHRONIZING DEVICE

John H. Letsinger and Harold F. Foley, Fort Wayne, Ind., assignors to International Harvester Company, a corporation of New Jersey Application August 26, 1944, Serial No. 551,358

13 Claims. (Cl. 192—53)

This invention relates to a synchronizing device for transmissions. More specifically, it relates to a synchronizing device of the energizing type. Synchronizing devices for the transmissions of automotive vehicles are now almost universally used on passenger cars and other light vehicles. Such devices have not been generally used on heavier transmissions necessary in heavy-duty trucks and tractors. One of the reasons for not using synchronizing devices on the heavy transmissions is that the manual effort necessary to engage friction clutches has been so great as to increase the synchronizing to such an extent that undesirable loss of speed is brought about.

The principal object of the present invention is to provide an improved synchronizing device utilizing a self-energizing friction clutch by means of which a sufficient pressure may be exerted on the synchronizing clutch by very small effort on the part of the operator.

Another principal object is to provide a positive means for retracting the friction clutch whenever desired without completing synchronization.

Other objects, including an improved and simplified synchronizing unit, will be apparent from the detailed description to follow.

In the drawing:

Figure 1 is a cross-sectional view of a synchronizer unit incorporating the invention as utilized in a conventional change-speed transmission;

Figure 2 is a fragmentary end view taken substantially on the line 2—2 of Figure 1;

Figure 3 is a detail view showing the energizing cams on the friction ring and its driving member;

Figure 4 is an enlarged detail face view of one of the power transmitting and detent members of the shifting device;

Figure 5 is a fragmentary end view of a portion of the shifting member;

Figure 6 is an inside radial face view of the shifting member of Figure 5;

Figure 7 is a detail view showing the relationship of the shifting member and the clutch ring in neutral or synchronized position;

Figure 8 is similar to Figure 7 showing the relation of the shifting member with respect to the clutch ring previous to synchronization.

As synchronizing devices of the type disclosed herein are widely used in transmissions of various types and as their installation in transmissions is well known to those skilled in the art, only a synchronizing unit has been illustrated with only such shafting and gearing being shown as are necessary to illustrate an operative installation.

A transmission casing wall 10, as shown in Figure 1, carries a ball-bearing assembly 11 in which a clutch shaft 12 is rotatably mounted. Said clutch shaft is driven from a conventional clutch as used with internal combustion engines.

The shaft 12 is provided with a gear 13 which drives a cluster in the conventional transmission construction by means of which power may be transmitted at a different speed ratio to a gear 14 journaled on a power output shaft 15. The shaft 15 is provided with a reduced end portion 16 rotatably carried on a suitable bearing in a bore 17 formed in the inner end of the shaft 12 within the gear 13.

The inner end portion of the shaft 12 beyond the gear 13 is provided with a flanged end portion 18 which is provided with gear teeth 19 of the type used for the dental or positive clutch. Said end portion of the shaft 12 is also provided with a flange 20 provided with a conical clutch face for cooperating with the mating face of an element of the synchronizing device to be hereinafter described.

The gear 14 is provided with a flanged portion 21 having gear teeth 22 corresponding to the gear teeth 19 to provide a positive or dental clutch. The gear 14 is also provided with a flange 23 having a conical clutch face similar to the clutch face on the flange 20. In synchronizing devices, it is common practice to have a double unit using exactly the same construction on opposite sides thereof to facilitate manufacture and to reduce the number of parts required.

The shaft 15 is provided adjacent the reduced end portion 16 with an enlarged end portion 24 providing a shoulder 25 against which an abutment washer 26 rests. The gear 21 in turn abuts the washer 26, being held against axial movement on its journal by a second annular member 27 which is retained in position by a snap ring 28.

The enlarged portion 24 of the shaft 15 is provided with a flange 29 of a substantial width in an axial direction and of a radius substantially greater than the radius of the enlarged portion 24. As best shown in Figure 2, the flange 29 is provided around its circumference with gear teeth 30 to provide for slidably mounting a shifter member 31 which is provided with internal gear teeth or splines 32 slidably fitting over the teeth 30. The teeth 30 are the same pitch as the teeth 19, whereas the shifting member 31 may be moved axially into engagement with either the teeth 19 or the teeth 22 whereby a positive drive may be transmitted from the shaft 12 to the shaft 15 or from the gear 14 to the shaft 15.

As shown both in Figure 1 and Figure 2, three circumferentially spaced slots 33 are formed around the flange 29 across the face thereof in an axial direction. In each of these slots a slidable key 34 is fitted for reciprocating movement in both axial and radial directions. A spring 35, fitted in a bore 36 extending radially inwardly from each slot 33, abuts each of the keys 34 urging the key against the inside of the shifting member 31. A tooth of the shifting member is cut away, as shown in Figure 2, to provide for the key which is of a width substantially equal to two teeth. Each of the keys 34 is provided with a bore 37 in which a ball 38 is seated. The ball may be permanently imbedded in the bore as it does not move relative thereto. A projecting portion of the ball engages a seat 39 formed at the inside of a bore 40 extending through the shifting member 31 and into a slot 41 in which a shifter element is adapted to ride. It will be noted in Figure 1 that the length of the key 34 is coextensive with the width of the flange 29.

As the friction clutch construction at each side of the flange 29 is identical, one side will be described and the same reference characters will be applied to corresponding elements at the other side. A friction clutch ring, L-shaped in cross-section, is mounted at each side of the flange 29 with the radial wall portion 42 abutting a radial face of the flange 29. Conical springs 43 abut the wall portion 42 to maintain it in contact with the flange 29 until force is applied to torque the spring. At one side, the spring 43 abuts the washer 26, previously described. At the other side, the spring 43 abuts a split retainer ring 44 mounted in a groove formed on the enlarged end portion 24 of the shaft 15. Each of the friction rings includes a circumferential wall 45 which is provided with a conical friction face 46 adapted to engage the corresponding face of its mating friction clutch element. The clutch rings are so constructed that normally there is a slight space between the mating clutch faces.

As best shown in Figure 3, the radial face of each clutch ring is provided with a series of equally spaced projections 47 having similarly formed cam faces 48 at each side thereof. The projections 47 extend into recesses 49 formed around the periphery of the flange 29. Said recesses are formed with angled end walls 50 corresponding in angularity to the cam portions 48 of the projections 47. As shown in Figure 3, the cams 50 are spaced circumferentially farther apart than the cams 48 to permit a certain amount of movement of the clutch ring 47 relative to the flange 29 without initiating axial movement of the ring relative to the flange.

It will be understood that when pressure is applied, for example, in a left-hand direction to the shifting member 31, the keys 34 abut the radial face portion 42 of the clutch ring, thereby urging the conical friction member 46 into engagement with the conical friction member 20. As soon as the engagement is brought about, there is a rotative force applied to the clutch ring due to the rotation of the shaft 12 relative to the shaft 15. This relative movement applies force to the clutch ring whereby one of the cam faces 48 is brought into engagement with one of the cam faces 50. Due to the angularity of these cam faces, axial force is exerted against the clutch ring acting to apply greater pressure against the conical friction faces. There is, therefore, a self-energizing or pressure build-up reaction which exerts an amplified force on the conical clutch faces. The amount of amplification depends upon the angle of the cam faces 48 and 50. A device of this type can be so constructed as to obtain a very large pressure on the friction clutch faces with the exertion of a very small force by the operator on the shifting member 31. This is particularly advantageous where large heavy transmissions are being operated. Where there is a large inertia force to be overcome before synchronization, a silent shifting can be accomplished.

In an energizing synchronizing device as above described, it is important to provide a means for retracting the friction clutch under any condition of operation including any time when synchronization has not been effected. If the operation is continued until synchronization is effected with release of the detent balls 38 and positive engagement of the shifting member 31 with the teeth 19, there is no longer any load on the clutch ring with the result that the spring 43 disengages the ring and returns it to its abutment against the flange 29. There are conditions of operation, however, when synchronization is not completed and when it is desired to positively retract the friction clutch ring.

As best shown in Figure 2, the circumferential face 45 of each clutch ring is provided with a plurality of spaced teeth 51 comparatively short in an axial direction. The teeth are provided at one end with tapered portions to form a pointed end 52. Figure 7 illustrates the position of the teeth 51 between the teeth 32 on the shifting member 31 when the friction clutch ring is in neutral or synchronized position. When in this position, the shifting member may be moved axially with respect to the teeth 51, said teeth sliding between two of the teeth 32. When synchronization is being effected with overrunning of the friction clutch ring, the teeth 51 are in the position shown in Figure 8 with respect to the teeth 32. To provide for this relative movement, the teeth 32 are cut away with slots 53 of a particular construction. The back side of the slots 53 are cut at right angles across the teeth 32 corresponding to the rear portion of the teeth 51. The front portions of the recesses 53 are cut off on angles 54 corresponding to the angles of the tapered pointed portion 52 of the teeth 51. When there is an overrunning condition of the friction clutch ring, there is both axial and circumferential movement of the projections 47 on the clutch ring whereby the teeth 51 are moved into a position as shown in Figure 8. In that position the friction ring may be retracted by returning the shifting member to its neutral position. Referring to Figures 7 and 8, an upward movement of the teeth 32 represents shifting of the clutch member from an engaging position to a neutral position. The square end portions of the teeth 32 engage the square end portions of the teeth 51 whereby positive pressure may be applied to withdraw the friction clutch ring and to disengage it from its mating face. This operation is particularly important in some conditions where synchronization has not been completed and where the shaft 12 reaches a stationary condition, for example, as when the vehicle is at rest. In such a condition, once the friction ring was engaged it would be impossible to complete the shift or to disengage the friction faces without some positive means as provided by the teeth 51.

The operation of applicants' improved synchronizing device has been explained in connection with the description of the individual elements thereof.

It is to be understood that applicants claim as

What is claimed is:

1. A synchronizing clutch construction comprising a rotatable member having a conical friction face formed thereon and a positive clutch element with teeth formed thereon adjacent the friction face, a shaft concentric with respect to said member, said shaft having an abutment flange thereon, a friction clutch member abutting said flange and having a conical face adjacent the conical face on the rotatable member, resilient means for urging said clutch member against said flange, a shifter member mounted on said flange for rotation with the shaft and for sliding movement axially thereof, said member having internal teeth engageable with the teeth on the rotatable member, said flange having cam structure thereon and said clutch member having structure including cammed projections effective to cooperate with the cam structure to move the clutch member axially upon relative movement circumferentially with respect to the flange, means for shifting the clutch member and bringing the conical faces into initial engagement, said cammed projections in cooperation with said cammed structure acting to energize the clutch member and increase the pressure in an axial direction against the conical clutch faces due to said energization, means on the shifter member and on the clutch member positively interengageable when relative angular movement takes place in an energizing direction between the flange and the clutch member whereby the clutch member may be withdrawn by the shifter member.

2. A synchronizing clutch construction comprising a rotatable member having a conical friction face formed thereon and a positive clutch element with teeth formed thereon adjacent the friction face, a shaft concentric with respect to said member, said shaft having an abutment flange thereon, a friction clutch member abutting said flange and having a conical face adjacent the conical face on the rotatable member, resilient means for urging said clutch member against said flange, a shifter member mounted on said flange for rotation with the shaft and for sliding movement axially thereof, said member having internal teeth engageable with the teeth on the rotatable member, said flange having cam structure thereon and said clutch member having structure including cammed projections effective to cooperate with the cam structure to move the clutch member axially upon relative movement circumferentially with respect to the flange, said flange also having recesses extending thereacross in an axial direction, clutch applying elements slidably mounted for reciprocation in said recesses, resilient latch means between said elements and the shifter member, whereby movement of the shifter member carries said clutch applying elements therewith, thereby shifting the clutch member and bringing the conical faces into engagement, said cammed projections in cooperation with said cammed structure acting to energize the clutch member and increase the pressure in an axial direction against the conical clutch faces due to said energization, and means on the shifter member and on the clutch member positively interengageable when relative angular movement takes place in an energizing direction between the flange and the clutch member whereby the clutch member may be withdrawn by the shifter member.

3. A synchronizing clutch construction comprising a rotatable member having a conical friction face formed thereon and a positive clutch element with teeth formed thereon adjacent the friction face, a shaft concentric with respect to said member, said shaft having an abutment flange thereon, a friction clutch member abutting said flange and having a conical face adjacent the conical face on the rotatable member, resilient means for urging said clutch member against said flange, a shifter member mounted on said flange for rotation with the shaft and for sliding movement axially thereof, said member having internal teeth engageable with the teeth on the rotatable member, said flange having cam structure thereon and said clutch member having structure including cammed projections effective to cooperate with the cam structure to move the clutch member axially upon relative movement circumferentially with respect to the flange, said flange also having recesses extending thereacross in an axial direction, and clutch applying elements slidably mounted for reciprocation in said recesses, resilient latch means between said elements and the shifter member, whereby movement of the shifter member carries said clutch applying elements therewith, thereby shifting the clutch member and bringing the conical faces into engagement, said cammed projections in cooperation with said cammed structure acting to energize the clutch member and increase the pressure in an axial direction against the conical clutch faces due to said energization, said clutch member having a plurality of teeth short in axial length projecting upwardly between teeth on the shifter member, said shifter member having its teeth cut away adjacent each of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization, the shifter member may be moved away from the actuating elements spring pressed thereagainst, thereby moving the teeth on the clutch member back into alinement with the corresponding space between two teeth on the shifter member and permitting engagement of the shifter member with the teeth on the gear.

4. A synchronizing clutch construction comprising a gear having a conical friction face formed thereon and a positive clutch element with teeth formed thereon adjacent the friction face, a shaft on which said gear is rotatably mounted, said shaft having an abutment flange thereon, a friction clutch member abutting said flange and having a conical face adjacent the conical face on the gear, resilient means for urging said clutch member against said flange, a shifter member splined on said flange for rotation with the shaft and for sliding movement axially thereof, said member having internal teeth engageable with the teeth on the gear, said flange having cammed recesses formed therein extending axially inwardly from the abutment face, and said clutch member having cammed projections engageable with said cammed recesses effective to move the clutch member axially upon relative movement circumferentially with respect to the flange, said flange also having recesses extending across the peripheral faces thereof in an axial direction, means for shifting the clutch member and bringing the conical faces into initial engagement, said cammed projections in cooperation with said cammed recesses acting to energize the clutch member and increase the pressure in an axial direction against the conical clutch faces due to said energization, means on the shifter member and on the clutch member positively interengageable when relative angular movement takes place in an energizing direction between the flange and the clutch member whereby the clutch member may be withdrawn by the shifter member.

5. A synchronizing clutch construction comprising a gear having a conical friction face formed thereon and a positive clutch element with teeth formed thereon adjacent the friction face, a shaft on which said gear is rotatably mounted, said shaft having a flange thereon, a friction clutch member abutting said flange and having a conical face adjacent the conical face on the gear, resilient means for urging said clutch member against said flange, a shifter member splined on said flange for rotation with the shaft and for sliding movement axially thereof, said member having internal teeth engageable with the teeth on the gear, said flange having cammed recesses formed therein extending axially inwardly from the abutment face, and said clutch member having cammed projections engageable with said cammed recesses effective to move the clutch member axially upon relative movement circumferentially with respect to the flange, said flange also having recesses extending across the peripheral faces thereof in an axial direction, and clutch applying elements slidably mounted for reciprocation in said recesses, said elements being also slidable radially in said recesses and being spring pressed in an outward radial direction, said elements having projections on their outside faces, and said shifter member having recesses engageable by said projections, whereby movement of the shifter member carries said clutch actuating element therewith, thereby shifting the clutch member and bringing the conical faces into engagement, said cammed projections in cooperation with said cammed recesses acting to energize the clutch member and increase the pressure in an axial direction against the conical clutch faces due to said energization, said clutch member having a plurality of teeth short in axial length projecting upwardly between teeth on the shifter member, said shifter member having its teeth cut away adjacent each of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization, the shifter member may be moved away from the actuating elements spring pressed thereagainst, thereby moving the teeth on the clutch member back into alinement with the corresponding space between two teeth on the shifter member and permitting engagement of the shifter member with the teeth on the gear.

6. A synchronizing clutch construction comprising rotatable members having spaced conical friction faces formed thereon and toothed positive clutch elements formed adjacent the friction faces, a shaft concentric with respect to said members, said shaft having a flange of substantial width projecting between said friction clutch faces, a friction clutch member abutting each side of the flange and having a conical friction face adjacent the conical face on the corresponding rotatable member, resilient means for urging said clutch members against said flange, a shifter member mounted on said flange for rotation with the shaft and for sliding movement in either direction axially thereof, said member having internal teeth engageable with the teeth on the rotatable members, said flange and said clutch members having a cammed structure therebetween effective to move the clutch members axially upon relative angular movement with respect to the flange, clutch applying elements carried by said flange and slidably mounted for reciprocation axially thereacross, resilient latch means between said element and the shifter member whereby movement of the shifter member in either direction carries said clutch actuating elements therewith thereby shifting the corresponding clutch member into engagement, and means on the shifter member and on the clutch members interengageable when the relative angular movement takes place whereby the clutch member may be positively withdrawn by retracting movement of the shifter member.

7. A synchronizing clutch construction comprising rotatable members having spaced conical friction faces formed thereon and toothed positive clutch elements formed adjacent the friction faces, a shaft concentric with respect to said members, said shaft having an abutment flange of substantial width projecting between said friction clutch faces, a friction clutch member abutting each side of the flange and having a conical friction face adjacent the conical face on the corresponding rotatable member, resilient means for urging said clutch members against said flange, a shifter member mounted on said flange for rotation with the shaft and for sliding movement in either direction axially thereof, said member having internal teeth engageable with the teeth on the rotatable members, said flange and said clutch members having a cammed structure therebetween effective to move the clutch members axially upon relative movement circumferentially with respect to the flange, said flange also having recesses extending thereacross in an axial direction, clutch applying elements slidably mounted for reciprocation in said recesses, resilient latch means between said element and the shifter member, whereby movement of the shifter member in either direction carries said clutch actuating elements therewith, thereby shifting the corresponding clutch member with the conical faces being brought into engagement, said cammed structure acting to energize a clutch member and increase the pressure in an axial direction against the conical clutch faces due to said energization, said clutch members having a plurality of teeth short in axial length projecting upwardly beneath teeth on the shifter member, said shifter member having its teeth cut away adjacent each side of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization the shifter member may be moved away from the actuating elements spring pressed thereagainst, thereby moving the teeth on the clutch member back into alinement with the corresponding space between two teeth on the shifter member and permitting engagement of the shifter member with the teeth on the corresponding gear.

8. A synchronizing clutch construction comprising gears having spaced conical friction faces formed thereon and toothed positive clutch elements formed adjacent the friction faces, a shaft with respect to which said gears are rotatably mounted, said shaft having a flange of substantial width projecting between said friction clutch faces, a friction clutch member abutting each side of the flange and having a conical friction face adjacent the conical face on the corresponding gear, resilient means for urging said clutch members against said flange, a shifter member splined on said flange for rotation with the shaft and for sliding movement in either direction axially thereof, said member having internal teeth engageable with the teeth on the gears, said flange having cammed recesses formed therein extending axially inwardly from the abutment faces, and said clutch members having cammed projections engageable with said cammed recesses effective to move the clutch members axially upon relative movement circumferentially with respect to the flange, said flange also having recesses extending across the peripheral faces thereof in an axial direction, clutch applying elements slidably mounted for reciprocation in said recesses, said elements being also slidable radially in said recesses and being spring pressed in an outward radial direction, said elements having spherical projections on their outside faces, and said shifter member having recesses engageable by said projections, whereby movement of the shifter member in either direction carries said clutch actuating elements therewith, thereby shifting the corresponding clutch member with the conical faces being brought into engagement, said cammed projections in cooperation with said cammed recesses acting to energize a clutch member and increase the pressure in an axial direction against the conical clutch faces due to said energization, said clutch members having a plurality of teeth short in axial length projecting upwardly between teeth on the shifter member, said shifter member having its teeth cut away adjacent each side of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization the shifter member may be moved away from the actuating elements spring pressed thereagainst, thereby moving the teeth on the clutch member back into alinement with the corresponding space between two teeth on the shifter member and permitting engagement of the shifter member with the teeth on the corresponding gear.

9. A synchronizing clutch construction comprising rotatable members having spaced conical friction faces formed thereon and toothed positive clutch elements formed adjacent the friction faces, a shaft concentric with respect to said members, said shaft having a flange of substantial width projecting between said friction clutch faces, a friction clutch member abutting each side of the flange and having a conical friction face adjacent the conical face on the corresponding rotatable member, resilient means for urging said clutch members against said flange, a shifter member mounted on said flange for rotation with the shaft and for sliding movement in either direction axially thereof, said member having internal teeth engageable with the teeth on the rotatable members, said flange and said clutch members having a cammed structure therebetween effective to move the clutch members axially upon relative movement circumferentially with respect to the flange, said flange also having recesses extending thereacross in an axial direction, clutch applying elements slidably mounted for reciprocation in said recesses, resilient latch means between said elements and the shifter member, whereby movement of the shifter member in either direction carries said clutch actuating elements therewith, thereby shifting the corresponding clutch member with the conical faces being brought into engagement, said cammed structure acting to energize a clutch member and increase the pressure in an axial direction against the conical clutch faces due to said energization, said clutch members having a plurality of teeth short in axial length projecting upwardly beneath teeth on the shifter member, said shifter member having its teeth cut away adjacent each side of the teeth on the clutch member to permit the relative angular shifting of the two members during camming action of the clutch member with respect to the shaft flange, and said teeth on the clutch member being square on their ends opposite the shaft flange, the cut away portions of the adjacent teeth on the shifter member being also square to provide abutment means whereby the clutch member may be positively withdrawn from engagement when in energizing position by retracting movement of the shifter member.

10. A synchronizing clutch construction comprising rotatable members having spaced conical friction faces formed thereon and toothed positive clutch elements formed adjacent the friction faces, a shaft concentric with respect to said members, said shaft having a flange of substantial width projecting between said friction clutch faces, a friction clutch member abutting each side of the flange and having a conical friction face adjacent the conical face on the corresponding rotatable member, resilient means for urging said clutch members against said flange, a shifter member mounted on said flange for rotation with the shaft and for sliding movement in either direction axially thereof, said member having internal teeth engageable with the teeth on the rotatable members, said flange and said clutch members having a cammed structure therebetween effective to move the clutch members axially upon relative movement circumferentially with respect to the flange, said flange also having recesses extending thereacross in an axial direction, clutch applying elements slidably mounted for reciprocation in said recesses, resilient latch means between said elements and the shifter member, whereby movement of the shifter member in either direction carries said clutch actuating elements therewith, thereby shifting the corresponding clutch member with the conical faces being brought into engagement said cammed structure acting to energize a clutch member and increase the pressure in an axial direction against the conical clutch faces due to said energization, said clutch members having a plurality of teeth short in axial length projecting upwardly beneath teeth on the shifter member, said shifter member having its teeth cut away adjacent each side of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization the shifter member may be moved away from the actuating elements spring pressed thereagainst, thereby moving the teeth on the clutch member back into alinement with the corresponding space between two teeth on the shifter member and permitting engagement of the shifter member with the teeth on the corresponding gear, and said teeth on the clutch member being square on their ends opposite the shaft flange, the cut away portions of the adjacent teeth on the shifter member being also square to provide abutment means whereby the clutch member may be positively withdrawn from engagement when in energizing position by retracting movement of the shifter member.

11. A synchronizing clutch construction comprising a shaft having a flange projecting therefrom, a friction clutch element abutting said flange and having a conical friction face thereon, resilient means for urging said clutch member against said flange, a shifter member splined on said flange for rotation with the shaft and for sliding movement thereof, said member having internal teeth, said flange and said clutch member having a cammed structure therebetween effective to move the clutch members axially upon relative movement circumferentially with respect to the flange, means for applying force upon movement of the shifter member to said clutch member, whereby the conical faces are brought into engagement, said cammed structure acting to energize a clutch member and increase the pressure in an axial direction against the engaging conical clutch faces due to said energization, said clutch members having a plurality of teeth short in axial length projecting upwardly between teeth on the shifter member, said shifter member having its teeth cut away adjacent each of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization the shifter member may be moved away from the actuating elements spring pressed thereagainst, thereby moving the teeth on the clutch member back into alinement with the corresponding space between two teeth on the shifter member and permitting further movement of the shifter member.

12. A synchronizing clutch construction comprising a shaft having a flange projecting therefrom, a friction clutch member abutting said flange and having a conical friction face thereon, resilient means for urging said clutch member against said flange, a shifter member splined on said flange for rotation with the shaft and for sliding movement thereof, said member having internal teeth, said flange and said clutch member having a cammed structure therebetween effective to move the clutch members axially upon relative movement circumferentially with respect to the flange, means for applying force upon movement of the shifter member to said clutch member, whereby the conical faces are brought into engagement, said cammed structure acting to energize a clutch member and increase the pressure in an axial direction against the engaging conical clutch faces due to said energization, said clutch members having a plurality of teeth short in axial length projecting upwardly between teeth on the shifter member, said shifter member having its teeth cut away adjacent each of the teeth on the clutch member to permit the relative angular shifting of the two members during camming action of the clutch member with respect to the shaft flange, and said teeth on the clutch member being square on their ends opposite the shaft flange, the cut away portions of the adjacent teeth on the shifter member being also square to provide abutment means whereby the clutch member may be positively withdrawn from engagement when in energizing position by retracting movement of the shifter member.

13. A synchronizing clutch construction comprising a shaft having a flange projecting therefrom, a friction clutch member abutting said flange and having a conical friction face thereon, resilient means for urging said clutch member against said flange, a shifter member splined on said flange for rotation with the shaft and for sliding movement thereof, said member having internal teeth, said flange and said clutch member having a cammed structure therebetween effective to move the clutch members axially upon relative movement circumferentially with respect to the flange, means for applying force upon movement of the shifter member to said clutch member, whereby the conical faces are brought into engagement, said cammed structure acting to energize a clutch member and increase the pressure in an axial direction against the engaging conical clutch faces due to said energization, said clutch members having a plurality of teeth short in axial length projecting upwardly between teeth on the shifter member, said shifter member having its teeth cut away adjacent each of the teeth on the clutch member to permit the relative angular shifting of the two members during camming action of the clutch member with respect to the shaft flange, said teeth on the clutch member being cammed on their faces adjacent the shaft flange and the cut away portions of the teeth on the shifter member being correspondingly cammed, whereby when the overrunning force on the clutch approaches zero due to substantial synchronization the shifter member may be further shifted in an axial direction, thereby moving the teeth on the clutch member back into alinement with the corresponding space between two teeth on the shifter member and permitting further movement of the shifter member, and said teeth on the clutch member being square on their ends opposite the shaft flange, the cut away portions of the adjacent teeth on the shifter member being also square to provide abutment means whereby the clutch member may be positively withdrawn from engagement when in energizing position by retracting movement of the shifter member.

JOHN H. LETSINGER.
HAROLD F. FOLEY.